United States Patent [19]

Rinaldo

[11] Patent Number: 5,199,528

[45] Date of Patent: Apr. 6, 1993

[54] FLOW CONTROLLER

[75] Inventor: John M. Rinaldo, E. Greenbush, N.Y.

[73] Assignee: Atlas Copco Aktiebolag, Sweden

[21] Appl. No.: 804,239

[22] Filed: Dec. 5, 1991

[51] Int. Cl.⁵ .............................................. F01M 1/18
[52] U.S. Cl. .................................. 184/6.4; 137/599; 417/287
[58] Field of Search ............... 184/6.4, 6.1, 6, 7.4, 184/6.11, 108; 417/286, 287, 291, 199.2; 137/599, 513.3

[56] References Cited

U.S. PATENT DOCUMENTS

| | | | |
|---|---|---|---|
| 1,717,814 | 6/1929 | Strong et al. | 417/291 |
| 1,997,700 | 4/1935 | Short | 184/6.4 |
| 2,871,981 | 2/1959 | Baits | 184/6.4 |
| 3,045,419 | 7/1962 | Addie et al. | 184/6.4 |
| 3,915,259 | 10/1975 | Otte | 184/7.4 |
| 4,569,196 | 2/1986 | Waddington et al. | 184/6.4 |
| 4,572,331 | 2/1986 | Powell et al. | 184/7.4 |

FOREIGN PATENT DOCUMENTS 0222987 12/1983 Japan ................................. 417/291

Primary Examiner—Ira S. Lazarus
Assistant Examiner—Alan B. Cariaso
Attorney, Agent, or Firm—Wall and Roehrig

[57] ABSTRACT

Apparatus for preventing damage to a machine in the event the machine inadvertently goes into reverse rotation. An automatically actuated flow controller is adapted to reroute the flow of lubricant to the primary pump when the machine rotates in a reverse direction thereby assuring that lubricant is supplied to the machine bearings, and the like, to prevent the machine from being damaged. The mechanism also has the ability to deliver a metered amount of lubricant to the main pump from an auxiliary pump to prime the main pump when the main pump is shut down thus allowing the main pump to be quickly brought on-line.

11 Claims, 3 Drawing Sheets

FLOW CONTROLLER

BACKGROUND OF THE INVENTION

This invention relates to an apparatus for protecting a rotating machine such as a centrifugal compressor, electric motor, internal combustion engine, and the like, in the event such a machine goes into reverse rotation and, in particular to an apparatus that automatically supplies lubrication to the machine's lubricated components during periods of reverse rotation.

Machines such as centrifugal compressors are able to operate as turbines which, unfortunately, is typically what occurs when there is a check valve failure. Conventionally, the oil pump is coupled directly to the compressor drive motor and will attempt to pull oil out of the compressor bearings and other lubricated components when the machine experiences a reversal in rotation. This, of course, can result in the destruction of the bearings and damage to other machine parts.

In order to provide reverse rotation protection, many manufacturers provide by-pass systems having as many as four check valves to insure that oil is delivered to the machine from the main pump regardless of the direction of rotation of the machine shaft. Independently driven auxiliary pumps are oftentimes provided which take over the lubrication load if the main pump fails or the machine is turning backwards. Even with the use of an auxiliary pump, the main pump will become dry during periods of reverse rotation thus requiring that the main pump be primed prior to once again assuming normal operations.

All protective devices found in the prior art require the use of additional equipment which greatly increases the cost of the machine. In addition, this type of protective equipment can be complex and difficult to maintain. Although providing a margin of safety, the protective equipment can itself fail thereby endangering the machine.

SUMMARY OF THE INVENTION

It is therefore an object of the present invention to safeguard rotary machines.

It is a further object of the present invention to automatically deliver lubricant to a rotating machine when the machine is running in reverse rotation.

Another object of the present invention is to prime the main pump of a rotating machine from an auxiliary pump when the machine is inoperative.

Yet another object of the present invention is to provide a simple and inexpensive device that will automatically protect a rotating machine from oil starvation when the machine experiences a reversal in normal operation.

These and other objects of the present invention are attained by means of an automatically operated flow controller for delivering lubricating oil to a rotating machine having a primary pump coupled to the drive unit of the machine. The flow controller further includes a housing having an inlet channel connected to the discharge side of the pump and spaced apart from the inlet channel, an outlet channel connected to the suction side of the pump. The two channels are interconnected by a pair of parallel passages. The first passage is connected to a supply reservoir for providing lubricating oil to the centrifugal machine and the second passage is connected to a system for lubricating the machine bearings and other components. Each passage contains a free-floating flow director which responds to the pressure exerted by oil moving in the system to selectively connect the reservoir and the rotating machine lubricating system to the pump to insure that an adequate supply of oil is delivered to the machine when it is running in either a normal mode of operation or a reverse mode of operation. The flow controller is also capable of operating in conjunction with an auxiliary pump to provide priming oil to the main pump during periods when the machine is not rotating.

BRIEF DESCRIPTION OF THE DRAWINGS

For a better understanding of these and other objects of the present invention, reference shall be made to the following detailed description of the invention which is to be read in association with the accompanying drawings, wherein.

DESCRIPTION OF THE INVENTION

Figure 1:
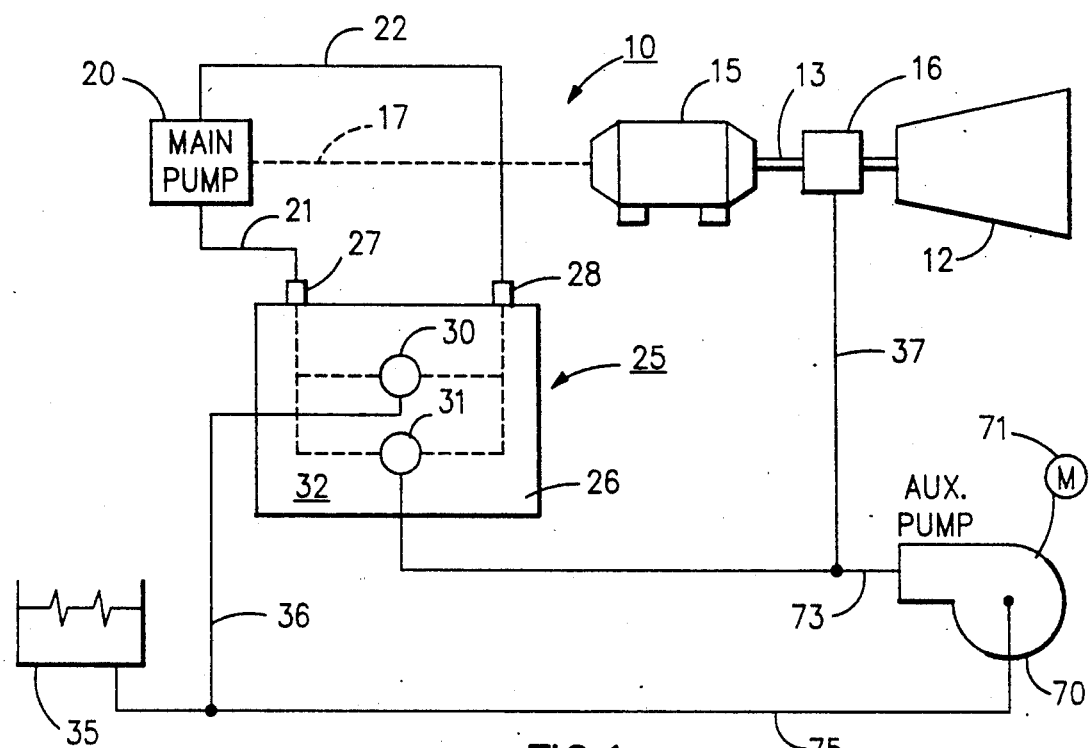
FIG. 1 is a schematic representation of a system for lubricating a centrifugal compressor utilizing the flow controller of the present invention.

Referring initially to FIG. 1 there is shown a schematic diagram of a system generally referenced 10, for providing lubricating oil to a centrifugal compressor 12. As noted above, when such a compressor experiences a check valve failure, the machine will rotate in a reverse direction, that is, a direction that is backwards in regard to its normal direction of rotation. As is conventional in the art, the compressor shaft 13 is coupled to a drive motor 15 and a gearbox 16 from which lubricating oil is distributed to the machine rotor bearings (not shown) and other machine components that may require lubrication or high pressure oil. The motor is also coupled by any suitable drive connection 17 to a primary or main pump 20 so that the pump delivers oil under pressure to discharge line 21 when the compressor is operating under normal conditions.

The suction side of the pump is connected to a suction line 22. Typically, the suction line of the pump is attached to an oil reservoir and the discharge line is arranged to deliver oil directly to the compressor gearbox. In the event the machine experiences a failure and rotates in a reverse direction, the pump operation will also be reversed and it will act to pull oil out of the compressor bearings. This will, of course, produce bearing damage or destruction and pose considerable risk to the machine.

In order to avoid damage to the centrifugal machine in the event of a reversal in shaft rotation, the present system is provided with an automatically actuated flow controller 25 that will reverse the pump function when it senses a reversal in shaft rotation. The flow control housing 26 has an inlet port 27 connected to the discharge line 21 of the pump 20 and an outlet port 28 connected to the suction line 22 of the pump. A pair of connectors 30 and 31 are mounted on the front wall 32 of the housing. The first connector 30 is operatively coupled to an oil reservoir 35 by means of supply line 36. The second connector 31 is similarly attached to the gearbox 16 of the compressor by means of input line 37.

Figure 2:
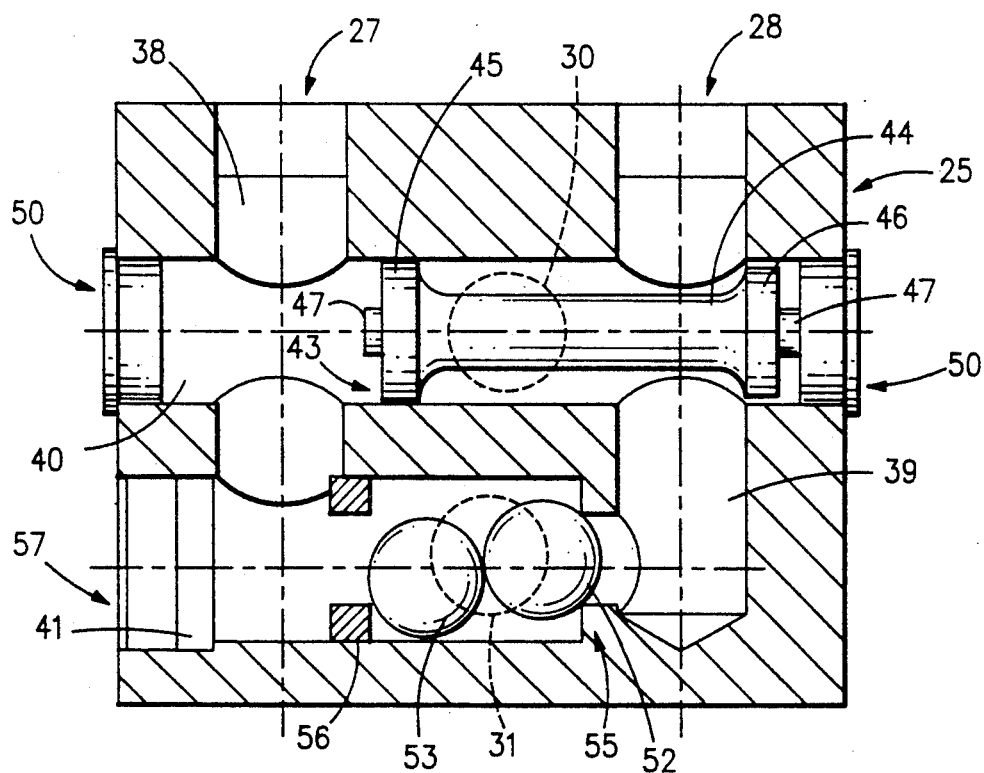
FIG. 2 is a plane view in section of the controller showing the positioning of the flow directors during normal operation of the compressor.

Turning now to FIG. 2, there is shown a sectional view of the housing 25 showing the positioning of the flow control components when the compressor is operating under normal conditions. The inlet port 27 communicates with an inlet channel 38 formed in the housing. The outlet port 28 communicates with an outlet channel 39 that is parallelly-aligned with the inlet channel 38 within the housing. The two channels are in turn interconnected by an upper passage 40 and spaced apart therefrom, a lower passage 41. The upper passage opens into first connector 30, while the lower passage 41 opens into second connector 31, both of which are shown in dotted outline in FIG. 2.

A free-floating, double-ended spool 43 is movably contained within the upper passage 40. The spool includes a central shaft 44 having slidable sealing elements 45 and 46 mounted upon opposing ends. Each sealing element is provided with an axially extended stop 47—47 which functions to limit the axial movement of the spool within the passage.

Each end of the upper passage is closed by a threaded plug 50 which can be removed to provide access to the passage and the spool. The spool stops are arranged to contact the inner end faces of the two plugs thus controlling the two extreme positions of the sealing elements within the passage.

Figure 6:
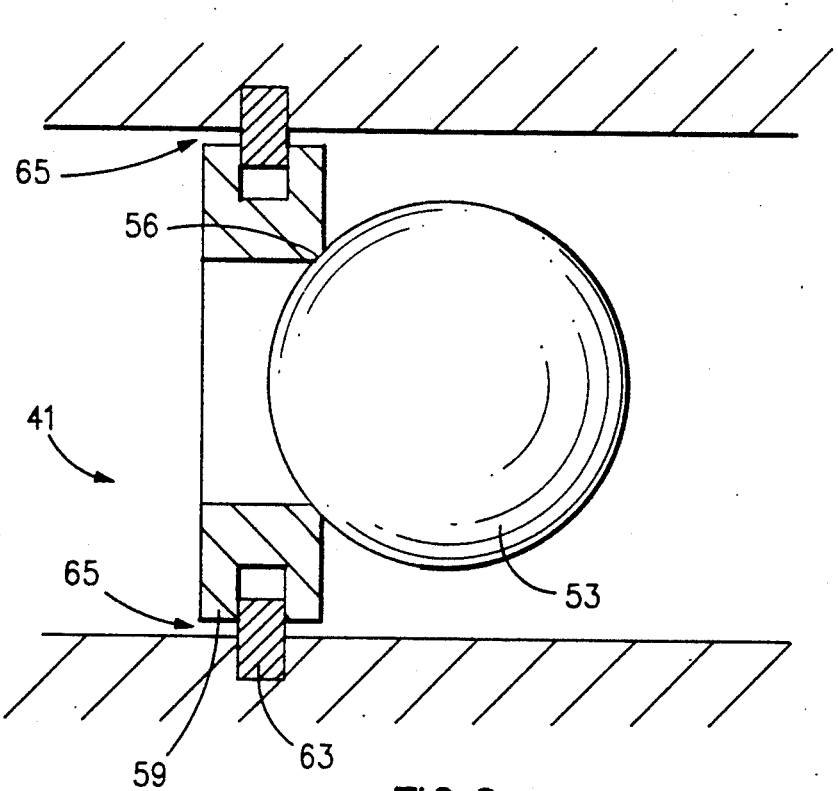
FIG. 6 is an enlarged partial side elevation in section showing the construction of a seat for receiving one of the two balls utilized in the main embodiment of the invention.

A pair of balls 52 and 53 are situated within the lower passage 41. The balls are permitted to move freely within the passage between a first seat 55 formed in the housing and a second seat 56. Access to the lower passage is furnished by threaded plug 57. As illustrated in FIG. 6, the seat facing the outlet chamber includes an annular-shaped bushing 59. The bushing is secured adjacent to the inlet channel 38 within passage 41 by means of a snap ring retainer 63. The bushing is a loose fit to the passage 41 which permits a metered amount of oil to leak past the seat when ball 53 is seated against the seat 56. The purpose for this controlled leakage will be disclosed in further detail below.

Both the spool 43 and the balls 52 and 53 are permitted to move freely in their respective passages in response to the oil pressure exerted thereon. When the compressor is running under normal operating conditions, high pressure oil is delivered from the main pump to inlet channel 38. The high pressure oil causes the spool to be forced into the position shown in FIG. 2. At the same time, the oil forces the balls back toward the outlet channel to close off seat 55.

When in this configuration, oil is drawn into the housing through first connector 30 and is passed on to the suction side of the main pump via outlet channel 39. High pressure oil exhausted from the pump is then routed into the inlet channel 38 of the housing via line 21. The oil forces the spool into the position shown in FIG. 2 thereby isolating connector 30 from the high pressure oil. The oil in the outlet channel also forces the balls back holding ball 52 tightly against seat 55. This isolates connector 31 from the outlet channel and permits the high pressure oil to flow freely into the gearbox 16 of the compressor 12. The flow controller will remain in this configuration as long as the compressor is turning in a normal direction.

Figure 3:
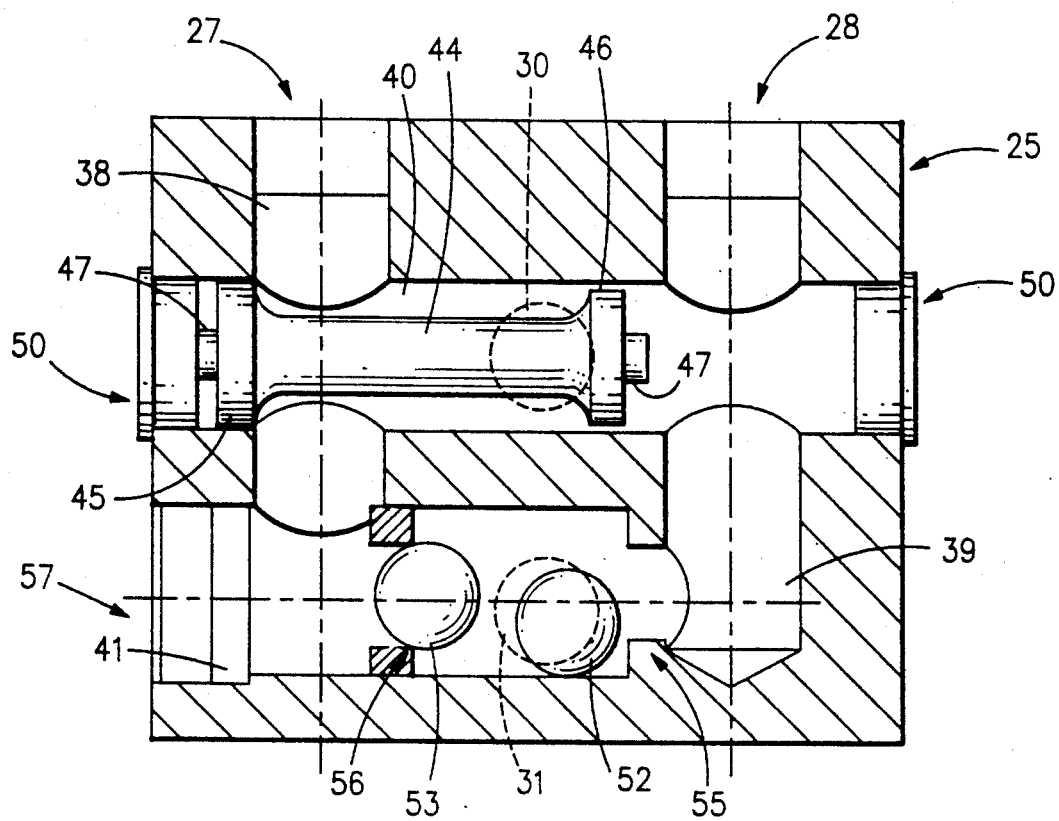
FIG. 3 is a view similar to FIG. 2 showing the positioning of the flow directors during reverse rotation of the compressor.

In the event the compressor experiences a failure and begins turning in a reverse direction, the flow controller will reverse the operation of the pump causing oil to be pumped into the flow controller through the outlet channel 39. This in turn will push the spool and the balls to the position shown in FIG. 3. The first connector is now isolated from the inlet channel allowing oil from the reservoir to be delivered to the pump via inlet channel 38 and discharge line 21. At the same time, ball 53 is forced into seat 56 opening the second connector 31 to the high pressure oil in the outlet channel. The high pressure oil passing through connector 31 is delivered via line 37 into the compressor gearbox from where it is distributed to the machine bearings and other components needing lubrication.

Figure 4:
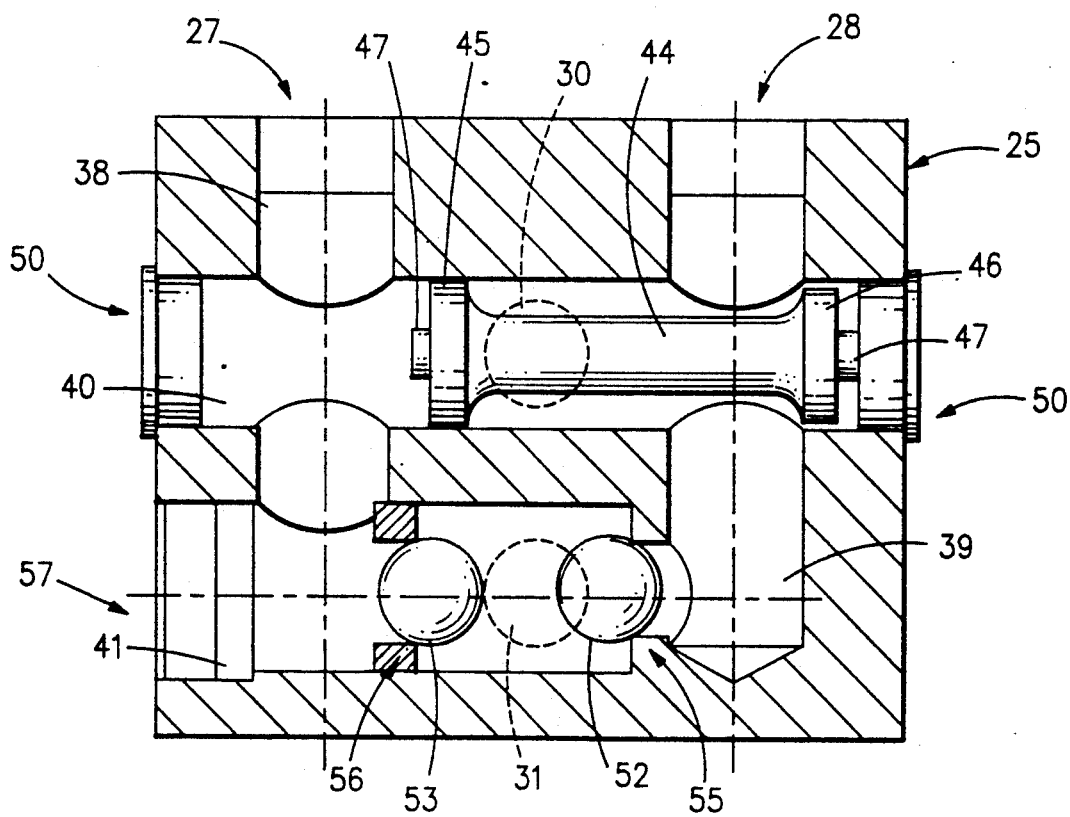
FIG. 4 is again a plane view in section of the controller showing the positioning of the flow directors when the main pump is shut down and the auxiliary pump is operating.

Returning to FIG. 1, the compressor oil supply system 10 may be furnished with an auxiliary pump 70 that is driven by an independent motor 71. The discharge side of the pump is connected into oil line 37 by auxiliary supply line 73. The suction side of the auxiliary pump is connected directly to the oil reservoir supply line 36 via line 75. In the event the compressor is not running, the auxiliary pump can be brought online either manually or automatically. At this time, the auxiliary pump sends high pressure oil directly to the compressor gearbox. High pressure oil is also delivered into the flow controller housing through connector 31. As illustrated in FIG. 4, this causes ball 52 to be forced into seat 55 and ball 53 into seat 56 isolating the main pump from the auxiliary pump. However, as noted above, some of the oil delivered into passage 41 via connector 31 is allowed to leak into inlet channel 38 through space 65 (FIG. 6). This oil will flow back into the primary pump through discharge line 21 in sufficient quantity to hold the pump in a primed condition. As a result, the primary pump can be brought quickly on-line when the compressor is started.

Figure 5:
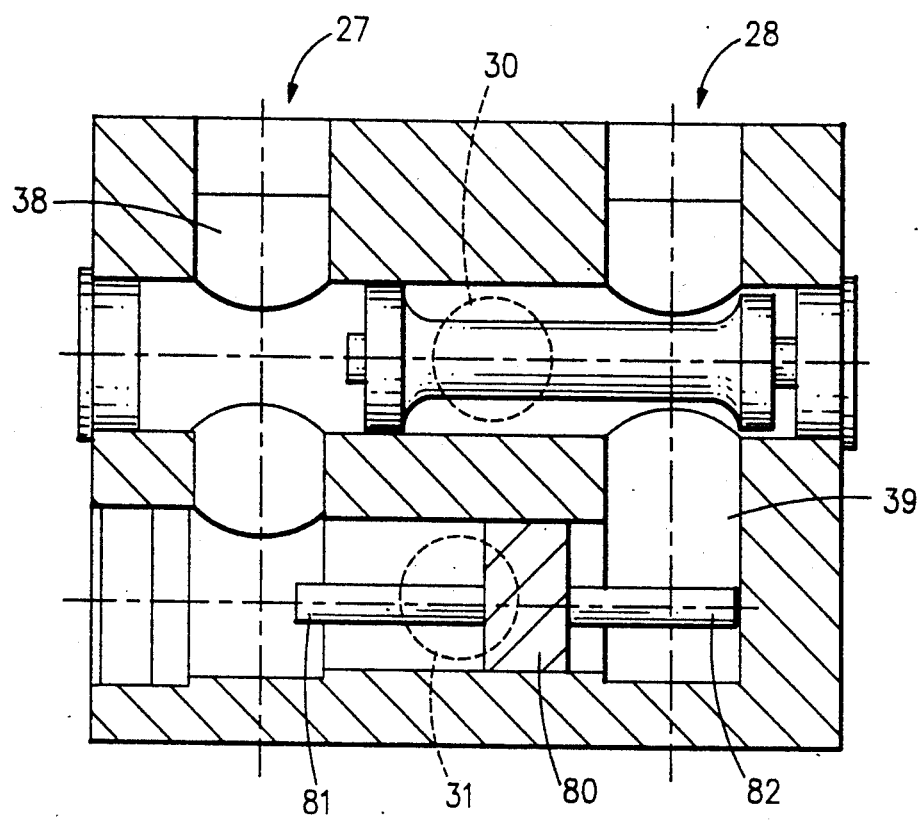
FIG. 5 is a plane view in section of the flow controller showing another embodiment of the invention for use when there is no auxiliary pump.

Turning now to FIG. 5, there is shown a second embodiment of the present invention in which the balls are replaced in the lower chamber 41 of the housing 25 with a single free-floating piston 80. Here again, the piston is allowed to move axially within the lower passage 41 in response to the force exerted thereon by the oil. Axially-extended stop 81 is positioned in the passage 41 adjacent to the inlet channel and a second stop 82 is similarly positioned in the passage adjacent to the outlet channel. The stops are connected to the piston and combine to limit the travel of the piston within the passage. The piston functions in the same manner as the balls to selectively isolate the compressor gearbox from either the inlet channel or the outlet channel of the housing.

While this invention has been described with specific detail to the disclosure above, it is not necessarily limited to that description. Rather, the invention is considered to include any modifications and variations that would present themselves to those skilled in the art without departing from the scope and spirit of this invention, as defined in the following claims.

What is claimed is:

1. A flow control apparatus for protecting a rotating machine coupled to a pump means from experiencing lubrication starvation in the event the machine and the pump go into reverse rotation, the apparatus including:
- a housing having an inlet channel connected to the discharge side of the pump means and an outlet channel, being spaced apart from said inlet channel, connected to the suction side of the pump means;
- said housing further including a first passage means connecting said spaced-apart inlet and outlet channels and a second passage means spaced apart from said first passage means also connecting said inlet and outlet channels;
- a first flow means for connecting said first passage means to a fluid reservoir containing a quantity of lubricating oil;
- a second flow means for connecting said second passage means to the rotating machine;
- a free-floating spool having axially-spaced sealing elements slidably contained within said first passage means moving therein in response to pressure exerted on said free-floating spool by fluid flowing through said housing, said first flow means thereby being placed in communication with either said inlet channel or said outlet channel; and
- a pair of balls positioned within said second passage means moving freely therein in response to pressure exerted on the balls by fluid flowing through said housing, said second flow means thereby being placed in communication with either said inlet or outlet channel.

2. The apparatus of claim 1 that further includes removable plug means associated with said housing for gaining access to said first and second passage means.

3. The apparatus of claim 2 wherein one of said seats is positioned adjacent to said inlet channel and includes further means associated with said seat to permit a predetermined amount of oil to flow through said inlet channel pump means whereby oil from an auxiliary pump connected to said second flow means will automatically prime the pump means when the machine is not operating.

4. The apparatus of claim 1 wherein the machine includes means to distribute oil to shaft bearings located within the machine;
- said housing further including a first passage means connecting said spaced-apart inlet and outlet channels and a second passage means spaced apart from said first passage means also connecting said inlet and outlet channels;
- a first flow means for connecting said first passage means to a fluid reservoir containing a quantity of lubricating oil;
- a second flow means for connecting said second passage means to the rotating machine;
- a free-floating spool having axially-spaced sealing elements slidably contained within said first passage means moving therein in response to pressure exerted on said free-floating spool by fluid flowing through said housing, said first flow means thereby being placed in communication with either said inlet channel or said outlet channel; and
- a pair of balls positioned within said second passage means moving freely therein in response to pressure exerted on the balls by fluid flowing through said housing, said second flow means thereby being placed in communication with either said inlet or outlet channel.

5. A flow control apparatus for protecting a rotating machine coupled to a pump means from experiencing lubrication starvation in the event the machine and the pump go into reverse rotation, the apparatus including:
- a housing having an inlet channel connected to the discharge side of the pump means and an outlet channel, being spaced apart from said inlet channel, connected to the suction side of the pump means;
- said housing further including a first passage means connecting said spaced-apart inlet and outlet channels and a second passage means spaced apart from said first passage means also connecting said inlet and outlet channels;
- a first flow means for connecting said first passage means to a fluid reservoir containing a quantity of lubricating oil;
- a second flow means for connecting said second passage means to the rotating machine;
- a first free-floating means mounted in said first passage means moving therein in response to pressure exerted on said first free-floating means by oil passing through said housing, said first flow means thereby being placed in communication with either said inlet or outlet channel; and
- a second free-floating means mounted in said second passage means moving therein in response to pressure exerted on said second free-floating means by oil passing through said housing, said second flow means thereby being placed in communication with either said inlet or outlet channel.

6. The apparatus of claim 5 wherein said first free-floating means is a spool having axially-spaced sealing elements that are slidably contained within said first passage means.

7. The apparatus of claim 6 wherein said second free-floating means includes a pair of balls arranged to selectively close against first and second seats mounted in said second passage means.

8. The apparatus of claim 6 that further includes removable plug means associated with said housing for gaining access to said first and second passage means.

9. The apparatus of claim 7 wherein one of said seats is positioned adjacent to said inlet channel and includes further means associated with said seat to permit a predetermined amount of oil to flow through said inlet channel pump means whereby oil from an auxiliary pump connected to said second flow means will automatically prime the pump means when the machine is not operating.

10. The apparatus of claim 6 wherein said second free-floating means further includes a piston mounted in said second passage means and stop means for limiting the axial travel of said piston.

11. The apparatus of claim 5 wherein the rotating machine includes means to distribute oil to shaft bearings located within the machine.

* * * * *

UNITED STATES PATENT AND TRADEMARK OFFICE
CERTIFICATE OF CORRECTION

PATENT NO. : 5,199,528
DATED : April 6, 1993
INVENTOR(S) : JOHN M. RINALDO

It is certified that error appears in the above-indentified patent and that said Letters Patent is hereby corrected as shown below:

Col. 5, line 43, please delete the ";" and everything thereafter to the end of claim 4, and insert --.--.

Signed and Sealed this

Eighth Day of March, 1994

Attest:

BRUCE LEHMAN

Attesting Officer      Commissioner of Patents and Trademarks